United States Patent
Sakaguchi

(10) Patent No.: US 11,507,107 B2
(45) Date of Patent: Nov. 22, 2022

(54) MAP INFORMATION SYSTEM

(71) Applicant: TOYOTA JIDOSHA KABUSHIKI KAISHA, Toyota (JP)

(72) Inventor: Eiji Sakaguchi, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 102 days.

(21) Appl. No.: 16/558,808

(22) Filed: Sep. 3, 2019

(65) Prior Publication Data
US 2020/0133303 A1 Apr. 30, 2020

(30) Foreign Application Priority Data

Oct. 29, 2018 (JP) .............................. JP2018-203026

(51) Int. Cl.
*G05D 1/02* (2020.01)
*G05D 1/00* (2006.01)
*G01C 21/32* (2006.01)

(52) U.S. Cl.
CPC ........... *G05D 1/0274* (2013.01); *G01C 21/32* (2013.01); *G05D 1/0061* (2013.01); *G05D 1/0088* (2013.01); *G05D 2201/0213* (2013.01)

(58) Field of Classification Search
CPC ........ G01C 21/32; G01C 21/30; G01C 21/34; G01C 21/3407; G01C 21/3841; G05D 1/0088; G05D 1/0274; G05D 1/0285; G05D 2201/0213; G06F 16/29; G06F 16/235; G08G 1/09; G08G 1/00; G08G 1/0112; G08G 1/0969; B60W 10/04; B60W 10/20; B60W 2530/209; B60W 2556/50;
(Continued)

(56) References Cited

U.S. PATENT DOCUMENTS

2017/0122749 A1* 5/2017 Urano ..................... G01S 19/42
2017/0232974 A1* 8/2017 Nishida ................. B60W 50/14
 701/24
2018/0056992 A1 3/2018 Sogen et al.
(Continued)

FOREIGN PATENT DOCUMENTS

| JP | 2017-100652 A | 6/2017 |
| JP | 2018-032333 A | 3/2018 |
| JP | 2018-141842 A | 9/2018 |

*Primary Examiner* — Alexander G Kalinowski
*Assistant Examiner* — Sanjeev Malhotra
(74) *Attorney, Agent, or Firm* — Sughrue Mion, PLLC

(57) ABSTRACT

A map information system includes: an in-vehicle device that executes automated driving control of a vehicle; and an external device having external map information used for the automated driving control. The in-vehicle device includes: a memory device in which map information is stored; and a control device configured to execute the automated driving control based on the map information stored in the memory device. The control device is further configured to: determine whether or not a takeover occurs during the automated driving control; set an upload target area including the takeover occurrence position, in a case where the takeover occurs during the automated driving control; and upload the map information regarding the upload target area to the external device. The external device updates the external map information based on the map information uploaded from the in-vehicle device.

5 Claims, 17 Drawing Sheets

(58) Field of Classification Search
CPC .... B60W 30/06; B60W 50/082; B60W 50/14; G06K 9/00791; G06K 9/00805; G06T 17/05
USPC .......................................................... 701/24
See application file for complete search history.

(56) References Cited

U.S. PATENT DOCUMENTS

| | | | |
|---|---|---|---|
| 2018/0113474 A1* | 4/2018 | Koda | G05D 1/0088 |
| 2018/0151066 A1* | 5/2018 | Oba | G05D 1/0285 |
| 2018/0245929 A1 | 8/2018 | Watanabe et al. | |
| 2019/0106120 A1* | 4/2019 | Hatano | B60W 10/20 |
| 2019/0368882 A1* | 12/2019 | Wheeler | G01C 21/3635 |
| 2020/0088527 A1* | 3/2020 | Koda | G01C 21/30 |
| 2020/0114927 A1* | 4/2020 | Yokota | G05B 13/026 |
| 2020/0209011 A1* | 7/2020 | Iwasaki | G08G 1/123 |
| 2020/0249670 A1* | 8/2020 | Takemura | G08G 1/096775 |
| 2020/0269835 A1* | 8/2020 | Hara | B60W 30/06 |
| 2020/0283022 A1* | 9/2020 | Hara | B60W 60/0025 |
| 2021/0004363 A1* | 1/2021 | Bailly | G01C 21/3848 |
| 2021/0024084 A1* | 1/2021 | Kim | G08G 1/096725 |

\* cited by examiner

<TERRAIN MAP INFORMATION TE_MAP>

| POSITION [X,Y] | HEIGHT Z | EVALUATION INFO. (NUMBER OF MEASUREMENTS, VARIANCE ETC.) | EVALUATION VALUE | TIME STAMP |
|---|---|---|---|---|

*Fig. 8*

MAP INFORMATION SYSTEM

BACKGROUND

Technical Field

The present disclosure relates to a technique for sharing map information used for automated driving control that controls automated driving of a vehicle.

Background Art

Patent Literature 1 discloses an automated driving control system. The automated driving control system includes an in-vehicle system and an infrastructure. The in-vehicle system has advanced map information including map information and environment information. The environment information includes information on a travel state of another vehicle, road conditions, traffic conditions, and so forth. Such the environment information is generated by the infrastructure. The in-vehicle system communicates with the infrastructure and updates the advanced map information every time it acquires the environment information.

List of Related Art

Patent Literature 1: Japanese Unexamined Patent Application Publication No. JP-2017-100652

SUMMARY

Map information is used in automated driving control that controls automated driving of a vehicle. It is desirable that an in-vehicle device and an external device such as a management server share the map information. It is necessary for sharing the map information to communicate the map information between the in-vehicle device and the external device. However, communicating the map information unconditionally causes increase in communication volume or communication frequency, which is not preferable.

An object of the present disclosure is to provide a technique that can suppress a communication volume or a communication frequency in a case where an in-vehicle device and an external device share map information.

In an aspect of the present disclosure, a map information system is provided.

The map information system includes:
an in-vehicle device installed on a vehicle and configured to execute automated driving control that controls automated driving of the vehicle; and
an external device having external map information used for the automated driving control.

The in-vehicle device includes:
a memory device in which map information is stored; and
a control device configured to execute the automated driving control based on the map information stored in the memory device.

The control device is further configured to:
determine whether or not a takeover being a transition from the automated driving control to manual driving occurs during the automated driving control;
set an upload target area including a position where the takeover occurs, in a case where the takeover occurs during the automated driving control; and
read the map information regarding the upload target area from the memory device and upload the read map information to the external device.

The external device is configured to execute external map update processing that updates the external map information based on the map information uploaded from the in-vehicle device.

According to the present disclosure, the in-vehicle device uploads the map information to the external device under a condition that a takeover occurs. The external device executes the external map update processing based on the map information uploaded from the in-vehicle device. As just described, the map information is prevented from being unconditionally uploaded to the external device. Under the condition that the takeover occurs, the map information regarding the upload target area including the takeover occurrence position is uploaded to the external device. Therefore, the communication volume or the communication frequency is suppressed.

BRIEF DESCRIPTION OF DRAWINGS

FIG. 8 is a conceptual diagram for explaining terrain map information in the embodiment of the present disclosure;

EMBODIMENTS

Embodiments of the present disclosure will be described below with reference to the attached drawings.

1. OUTLINE

Figure 1:
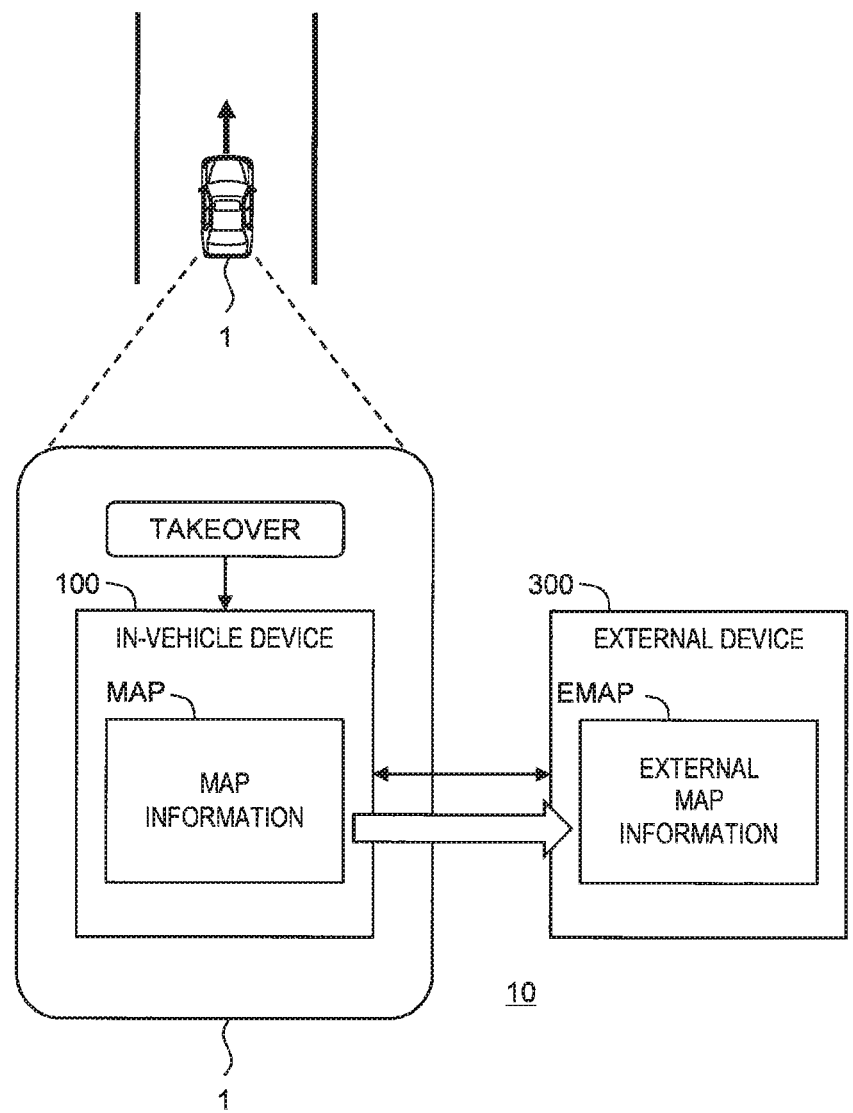
FIG. 1 is a block diagram schematically showing a map information system according to the embodiment of the present disclosure.

FIG. 1 is a block diagram schematically showing a map information system 10 according to the present embodiment. The map information system 10 includes an in-vehicle device 100 and an external device 300.

The in-vehicle device 100 is installed on a vehicle 1. The in-vehicle device 100 executes automated driving control that controls automated driving of the vehicle 1. In the automated driving control, map information MAP is used. The map information MAP provides a variety of information associated with a position. Here, the position is an absolute position and is defined in an absolute coordinate system (e.g. latitude, longitude, and altitude). Increase in quality of the map information MAP results in increase in accuracy of the automated driving control executed based on the map information MAP.

The in-vehicle device 100 can update the map information MAP. For example, the in-vehicle device 100 uses a sensor installed on the vehicle 1 to acquire a variety of information. Information acquired by the sensor installed on the vehicle 1 indicates driving environment for the vehicle, and such the information is hereinafter referred to as "driving environment information". The in-vehicle device 100 can update the map information MAP based on the driving environment information. Such the processing of updating the map information MAP based on the driving environment information is hereinafter referred to as "internal update processing".

The external device 300 is separated from the in-vehicle device 100 and exists outside the vehicle 1. The external device 300 has external map information EMAP. The external map information EMAP is the same kind of information as the map information MAP. However, date-and-time of update and quality of the external map information EMAP are not always the same as those of the map information MAP. For example, the internal update processing in the vehicle 1 may cause differences in date-and-time of update and quality between the map information MAP and the external map information EMAP.

It is desirable that the in-vehicle device 100 and the external device 300 share the map information MAP. It is necessary for sharing the map information MAP to communicate the map information MAP between the in-vehicle device 100 and the external device 300. However, communicating the map information MAP unconditionally causes increase in communication volume or communication frequency, which is not preferable.

For example, the in-vehicle device 100 communicates with the external device 300 to upload the map information MAP regarding a certain area to the external device 300. The external device 300 updates the external map information EMAP as appropriate based on the map information MAP uploaded from the in-vehicle device 100. Such the processing of updating the external map information EMAP by the use of the map information MAP is hereinafter referred to as "external map update processing". Executing the external map update processing unconditionally causes increase in communication volume or communication frequency, which is not preferable.

In view of the above, the present embodiment provides a technique that can suppress a communication volume or a communication frequency when sharing the map information MAP. For that purpose, the present embodiment focuses on a "takeover" during execution of the automated driving control.

The takeover means a transition from the automated driving control by the in-vehicle device 100 to manual driving by a driver of the vehicle 1. In other words, the takeover means that the driver takes over the driving of the vehicle 1 from the in-vehicle device 100. For example, the in-vehicle device 100 makes a demand (a transition demand or a take-over demand) on the driver for the takeover, and the driver starts the manual driving in response to the demand. As another example, the driver may start the manual driving voluntarily. The takeover is also called an override. Typically, the takeover is performed by a driving operation (i.e. at least one of a steering operation, an acceleration operation, and a braking operation) by the driver.

The in-vehicle device 100 determines whether or not the takeover occurs during the automated driving control. This determination processing itself may be executed during the automated driving control or may be executed after the automated driving control is terminated. In a case where the takeover occurs during the automated driving control, the in-vehicle device 100 detects a position where the takeover occurs. The position where the takeover occurs is hereinafter referred to as a "takeover occurrence position".

The in-vehicle device 100 sets an upload target area so as to include the takeover occurrence position. For example, the upload target area includes the takeover occurrence position and its vicinity. The upload target area is smaller than an area of the map information MAP to which the internal update processing is applied. In other words, the upload target area is smaller than a vehicle travel area in which the driving environment information is acquired. Then, the in-vehicle device 100 uploads the map information MAP regarding the upload target area to the external device 300. The external device 300 executes the external map update processing based on the map information MAP uploaded from the in-vehicle device 100.

As described above, the in-vehicle device 100 according to the present embodiment uploads the map information MAP to the external device 300 under a condition that a takeover occurs. The external device 300 executes the external map update processing based on the map information MAP uploaded from the in-vehicle device 100. The map information MAP is prevented from being unconditionally uploaded to the external device 300. Under the condition that the takeover occurs, the map information MAP regarding the upload target area including the takeover occurrence position is uploaded to the external device 300. Therefore, the communication volume or the communication frequency is suppressed.

The reasons why occurrence of takeover is used as a condition are as follows.

For example, there is a possibility that an event that is difficult for the automated driving control to handle exists at or near the takeover occurrence position. The map information MAP relating to the difficult event is important for the automated driving control. Preferentially uploading such the important map information MAP to the external device 300 makes it possible to efficiently increase accuracy of the external map information EMAP.

As another example, let us consider a case where a road condition has been greatly changed as compared with that at a time of previous travel. For instance, the road condition is greatly changed due to road constructions, fallen objects, natural disasters, and so forth. If the road condition has been greatly changed as compared with that at a time of previous travel, the old map information MAP may not achieve the automated driving control with sufficient accuracy, which may cause a takeover. That is, there is a possibility that the road condition has been greatly changed at or near the takeover occurrence position. Preferentially uploading such the great change in the road condition to the external device 300 makes it possible to efficiently increase accuracy of the external map information EMAP. Conversely, there is no need to hastily update the external map information EMAP with respect to an area where the road condition has not been changed so much.

From a point of view described above, the in-vehicle device 100 uploads the map information MAP regarding the upload target area including the takeover occurrence position to the external device 300 under a condition that a takeover occurs. As a result, it is expected that the accuracy of the external map information EMAP is efficiently increased. Anyway, since the map information MAP is selectively uploaded to the external device 300, the communication volume or the communication frequency is suppressed. These mean that the external map update processing is efficiently executed, which is preferable.

After executing the internal update processing, the in-vehicle device 100 may upload the latest map information MAP regarding the upload target area to the external device 300. Since the external map information EMAP is updated based on the latest map information MAP, it is expected that the accuracy of the external map information EMAP is further efficiently increased.

Hereinafter, the map information system 10 according to the present embodiment will be described in more detail.

2. CONFIGURATION EXAMPLE OF MAP INFORMATION SYSTEM 10

2-1. Configuration Example of In-Vehicle Device 100

Figure 2:
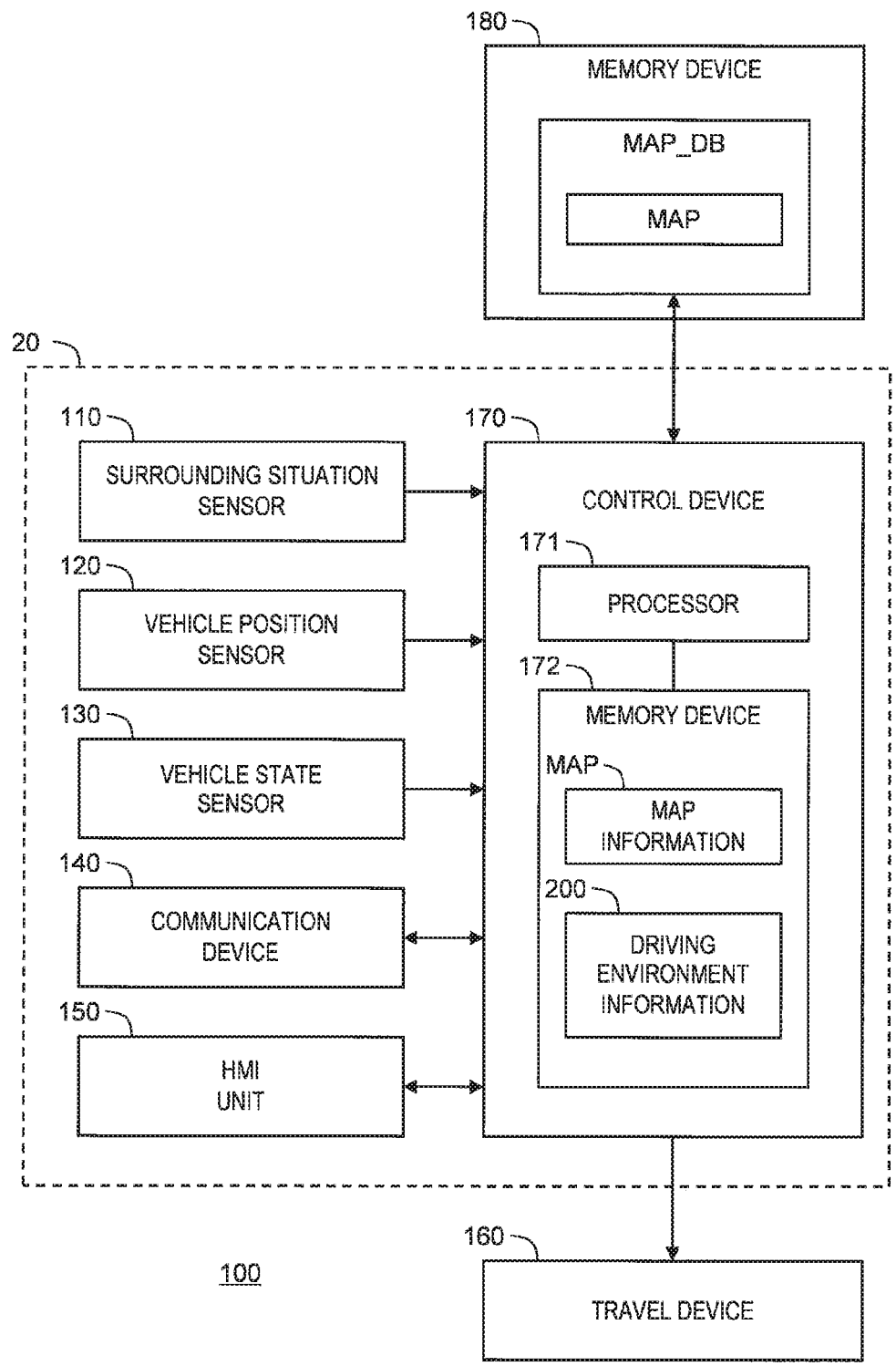
FIG. 2 is a block diagram showing a configuration example of an in-vehicle device according to the embodiment of the present disclosure.

FIG. 2 is a block diagram showing a configuration example of the in-vehicle device 100 according to the present embodiment. The in-vehicle device 100 is installed on the vehicle 1 and includes a surrounding situation sensor 110, a vehicle position sensor 120, a vehicle state sensor 130, a communication device 140, an HMI (Human Machine Interface) unit 150, a travel device 160, a control device (controller) 170, and a memory device 180.

The surrounding situation sensor 110 detects (recognizes) a situation around the vehicle 1. The surrounding situation sensor 110 is exemplified by a camera (imaging device), a LIDAR (Laser Imaging Detection and Ranging), a radar, and so forth. The camera images a situation around the vehicle 1. The LIDAR uses laser beams to detect a target around the vehicle 1. The radar uses radio waves to detect a target around the vehicle 1.

The vehicle position sensor 120 detects a position and an orientation (e.g. azimuth) of the vehicle 1. For example, the vehicle position sensor 120 includes a GPS (Global Positioning System) sensor. The GPS sensor receives signals transmitted from a plurality of GPS satellites and calculates the position and the orientation of the vehicle 1 based on the received signals.

The vehicle state sensor 130 detects a state of the vehicle 1. The state of the vehicle 1 includes a speed of the vehicle 1 (i.e. a vehicle speed), an acceleration, a steering angle, a yaw rate, and so forth. The state of the vehicle 1 further includes a driving operation by a driver of the vehicle 1. The driving operation includes an acceleration operation, a braking operation, and a steering operation.

The communication device 140 communicates with the outside of the vehicle 1. For example, the communication device 140 communicates with the external device 300 outside the vehicle 1 through a communication network. The communication device 140 may perform a V2I communication (vehicle-to-infrastructure communication) with a surrounding infrastructure. The communication device 140 performs a V2V communication (vehicle-to-vehicle communication) with a surrounding vehicle.

The HMI unit 150 is an interface for proving the driver with information and receiving information from the driver. More specifically, the HMI unit 150 includes an input device and an output device. The input device is exemplified by a touch panel, a switch, a microphone, and the like. The output device is exemplified by a display device, a speaker, and the like.

The travel device 160 includes a steering device, a driving device, and a braking device. The steering device turns wheels. The driving device is a power source that generates a driving force. The driving device is exemplified by an engine and an electric motor. The braking device generates a braking force.

A map database MAP_DB is stored in the memory device 180. The map database MAP_DB is a set of a variety of map information MAP. Examples of the variety of map information MAP will be described later (see Section 3).

The control device (controller) 170 is a microcomputer including a processor 171 and a memory device 172. The control device 170 is also called an ECU (Electronic Control Unit). A variety of processing by the control device 170 is achieved by the processor 171 executing a control program stored in the memory device 172.

For example, the control device 170 acquires driving environment information 200 indicating driving environment for the vehicle 1. The driving environment information 200 is stored in the memory device 172 and read out from the memory device 172 to be used, as appropriate.

Figure 3:
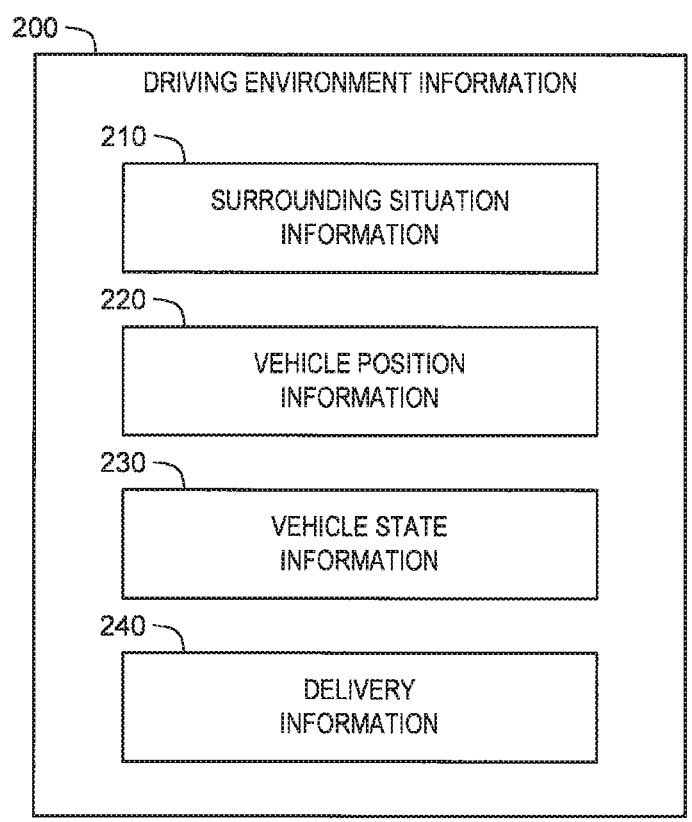
FIG. 3 is a block diagram showing an example of driving environment information used in the embodiment of the present disclosure.

FIG. 3 is a block diagram showing an example of the driving environment information 200. The driving environment information 200 includes surrounding situation information 210, vehicle position information 220, vehicle state information 230, and delivery information 240.

The surrounding situation information 210 indicates the situation around the vehicle 1. The surrounding situation information 210 is information obtained from a result of detection by the surrounding situation sensor 110. For example, the surrounding situation information 210 includes image information obtained by the camera. The surrounding situation information 210 may include measurement information obtained by the LIDAR and the radar. The surrounding situation information 210 may include target information regarding a target detected based on the image information and the measurement information. The target around the vehicle 1 is exemplified by a surrounding vehicle, a pedestrian, a white line, a roadside structure, a sign, and so forth. The target information includes a relative position, a relative velocity, and the like of the detected target. The control device 170 acquires the surrounding situation information 210 based on the result of detection by the surrounding situation sensor 110.

The vehicle position information 220 indicates the position and the orientation of the vehicle 1. The control device 170 acquires the vehicle position information 220 from the vehicle position sensor 120. Furthermore, the control device 170 may execute a well-known localizing processing by the use of the target information included in the surrounding situation information 210 to increase accuracy of the vehicle position information 220.

The vehicle state information 230 indicates the state of the vehicle 1. The state of the vehicle 1 includes the speed of the vehicle 1 (i.e. the vehicle speed), the acceleration, the steering angle, the yaw rate, and so forth. The state of the vehicle 1 further includes the driving operation by the driver of the vehicle 1. The driving operation includes the acceleration operation, the braking operation, and the steering operation. The control device 170 acquires the vehicle state information 230 from the vehicle state sensor 130.

The delivery information 240 is information acquired through the communication device 140. The control device 170 acquires the delivery information 240 by using the communication device 140 to communicate with the outside of the vehicle 1. For example, the delivery information 240 includes road traffic information (e.g. road work zone information, accident information, traffic restriction information, traffic jam information) delivered from an infrastructure. The delivery information 240 may include information on the surrounding vehicle acquired through the V2V communication.

In addition, the control device 170 acquires the map information MAP necessary for the automated driving control from the map database MAP_DB. The map information MAP is stored in the memory device 172 and read out from the memory device 172 to be used, as appropriate.

Furthermore, the control device 170 executes the automated driving control. For example, the control device 170 generates a travel plan for the vehicle 1 based on the map information MAP and the driving environment information 200. The travel plan includes a target route to a destination and a local target trajectory (e.g. a target trajectory within a lane, a target trajectory for a lane change). Moreover, the travel plan includes a vehicle travel control plan for traveling so as to follow the target trajectory, following a traffic rule, avoiding an obstacle, and so forth. The control device 170 executes vehicle travel control such that the vehicle 1 travels in accordance with the travel plan. The vehicle travel control includes steering control, acceleration control, and deceleration control. The control device 170 executes the steering control, the acceleration control, and the deceleration control by appropriately actuating the travel device 160 (i.e. the steering device, the driving device, and the braking device).

Moreover, the control device 170 executes the "internal update processing" that updates the map database MAP_DB (i.e. the map information MAP) stored in the memory device 180. The internal update processing is executed based on the driving environment information 200. The internal update processing is executed during the automated driving control or after the automated driving control is terminated. Details of the internal update processing will be described later (see Section 4).

Furthermore, the control device 170 communicates with the external device 300 through the communication device 140.

For example, the control device 170 communicates with the external device 300 to download the external map information. EMAP regarding a download target area from the external device 300. The download target area is, for example, a planned travel area in which the vehicle 1 is planned to travel. The control device 170 updates the map information MAP as appropriate based on the external map information EMAP downloaded from the external device 300.

Moreover, the control device 170 communicates with the external device 300 to upload the map information MAP regarding the upload target area to the external device 300. More specifically, the control device 170 reads the map information MAP regarding the upload target area from the memory device 180 (i.e. the map database MAP_DB). Then, the control device 170 uploads the read map information MAP to the external device 300 through the communication device 140.

Furthermore, the control device 170 determines whether or not a takeover occurs during the automated driving control. Typically, the takeover is performed by the driving operation (i.e. at least one of the steering operation, the acceleration operation, and the braking operation) by the driver. Therefore, the control device 170 can determine, based on the vehicle state information 230, whether or not the takeover occurs. In a case where the takeover occurs, the control device 170 detects the takeover occurrence position based on the vehicle position information 220.

2-2. Configuration Example of Information Acquisition Device 20

An information acquisition device 20 acquires the driving environment information 200. As shown in FIG. 2, the surrounding situation sensor 110, the vehicle position sensor 120, the vehicle state sensor 130, the communication device 140, and the control device 170 constitute the information acquisition device 20.

2-3. Configuration Example of External Device 300

Figure 4:
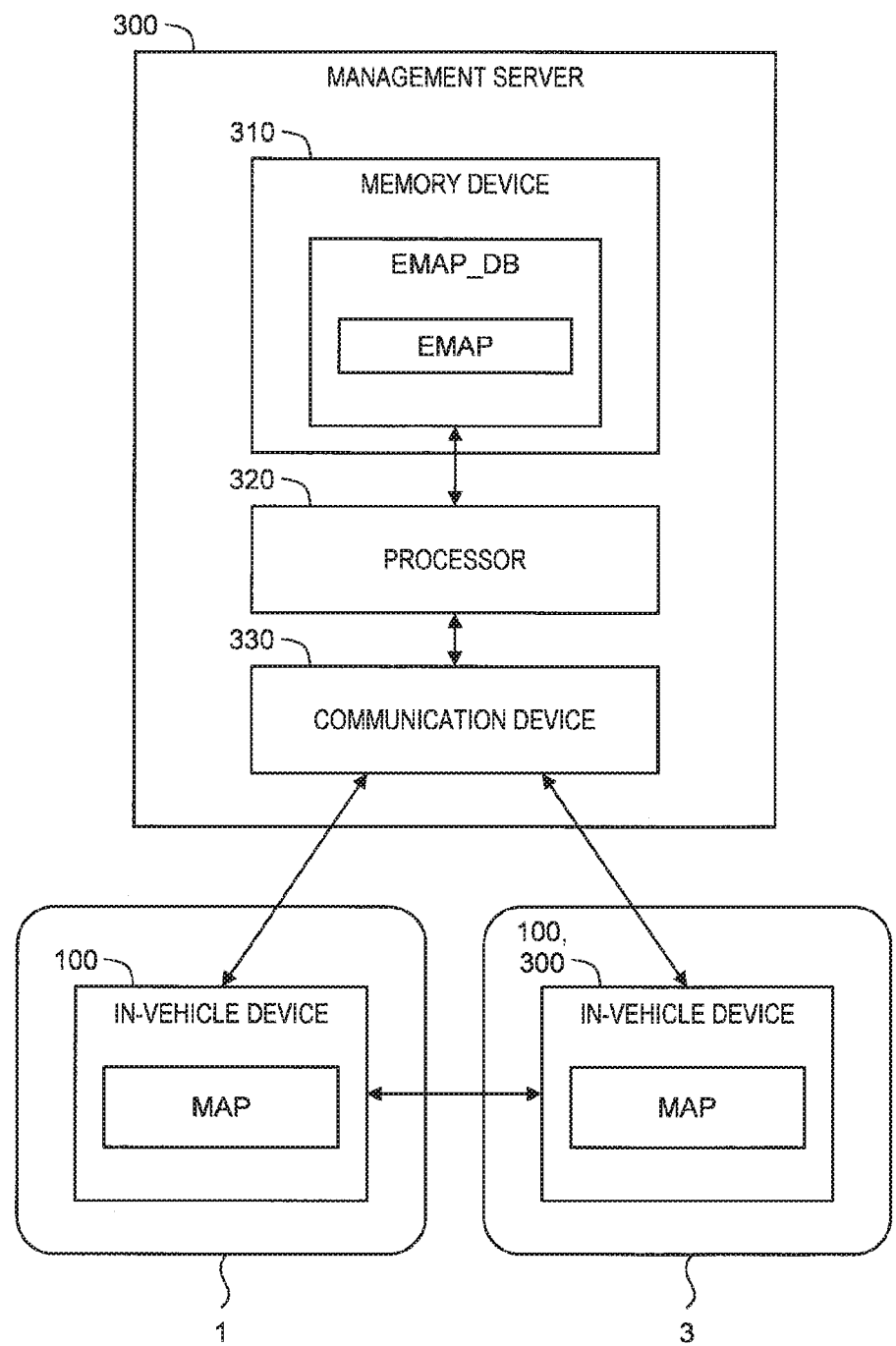
FIG. 4 is a block diagram showing a configuration example of an external device according to the embodiment of the present disclosure.

FIG. 4 is a block diagram showing a configuration example of the external device 300 according to the present embodiment. For example, the external device 300 is a management server that exists outside the vehicle 1. As another example, the external device 300 is another in-vehicle device 100 installed on another vehicle 3.

The external device 300 includes a memory device 310, a processor 320, and a communication device 330. A map database EMAP_DB is stored in the memory device 310. The map database EMAP_DB is a set of a variety of external map information EMAP. The processor 320 manages the map database EMAP_DB (i.e. the external map information EMAP). Processing by the processor 320 is achieved by the processor 320 executing a computer program stored in the memory device. The communication device 330 communicates with the communication device 140 of the in-vehicle device 100. When the external device 300 is the management server, the communication device 330 communicates with respective in-vehicle devices 100 of the vehicle 1 and another vehicle 3.

The management of the map database EMAP_DB includes the above-described "external map update processing". In the external map update processing, the processor 320 receives the map information MAP uploaded from the in-vehicle device 100 of the vehicle 1 or another vehicle 3 through the communication device 330. Then, based on the received map information MAP, the processor 320 updates the external map information EMAP stored in the memory device 310. Details of the external map update processing will be described later (see Section 5).

The management of the map database EMAP_DB further includes providing the external map information EMAP. For example, the processor 320 receives a map provision request from the in-vehicle device 100 of the vehicle 1 or another vehicle 3 through the communication device 330. The processor 320 reads the external map information EMAP requested by the map provision request from the memory device 310. Then, the processor 320 transmits the external map information EMAP to the request source through the communication device 330. The external map information EMAP transmitted to the request source is used for update of the map information MAP and so forth in the request source.

3. EXAMPLES OF MAP INFORMATION MAP

Figure 5:
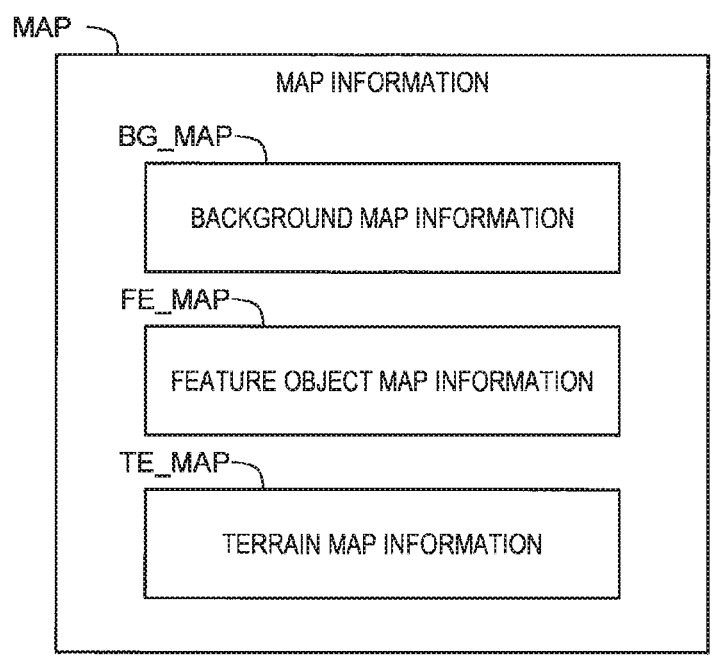
FIG. 5 is a block diagram showing various examples of map information in the embodiment of the present disclosure.

Next, examples of the map information MAP according to the present embodiment will be described. Note that the same applies to the external map information EMAP. The map information MAP includes not only a road map and a navigation map commonly used but also map information in various aspects. In an example shown in FIG. 5, the map information MAP includes background map information BG_MAP, feature object map information FE_MAP, and terrain map information TE_MAP. Each map information provides information associated with position (absolute position). Hereinafter, each map information will be described in detail.

3-1. Background Map Information BG_MAP

Figure 6:
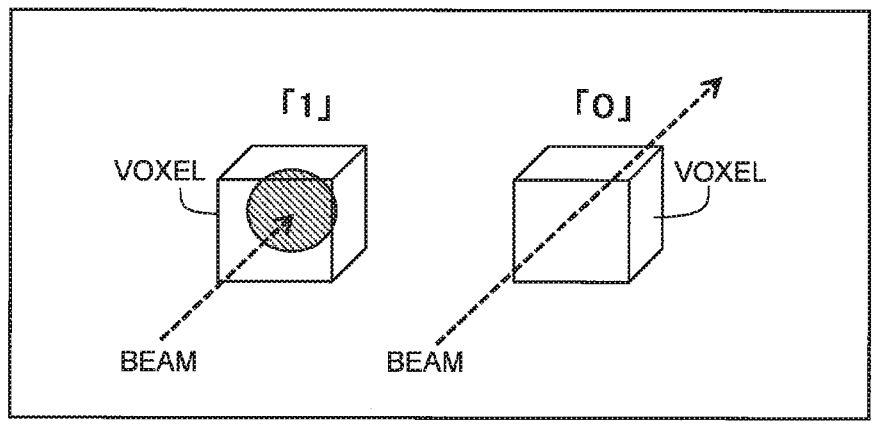
FIG. 6 is a conceptual diagram for explaining background map information in the embodiment of the present disclosure.

FIG. 6 is a conceptual diagram for explaining the background map information BG_MAP. The background map information BG_MAP, which is map information regarding a stationary object, indicates for each position (absolute position) whether or not a stationary object exists. The stationary object includes a steady road-related structure such as a wall, a guardrail, and the like.

For example, the LIDAR included in the surrounding situation sensor 110 is used for detecting the stationary object. The LIDAR outputs laser beams to a plurality of directions in sequence (i.e. scanning). It is possible to calculate distances and directions of reflection points based on a reflection state of the laser beams. A LIDAR point cloud is a group of measurement points (i.e. the reflection points) measured by the LIDAR.

Space surrounding the vehicle 1 is divided into a large number of voxels V. When at least one laser beam is reflected at a certain voxel $V_i$, a measurement result value $M_i$ regarding the voxel $V_i$ is set to "1". When all laser beams entering into a certain voxel $V_i$ pass through without being reflected, the measurement result value $M_i$ regarding the voxel $V_i$ is set to "0". The measurement result value $M_i$ being "1" means that some kind of object exists in the voxel $V_i$. On the other hand, the measurement result value $M_i$ being "0" means that no object exists in the voxel $V_i$.

The LIDAR performs the laser beam scanning repeatedly in terms of time. Accordingly, a plurality of measurement result values $M_i$ that are successive in terms of time are obtained with regard to the same voxel $V_i$. An "occupancy $R_i$" regarding the voxel $V_i$ is defined by an average value of the plurality of measurement result values $M_i$. When the number of measurements is N, the occupancy $R_i$ regarding the voxel $V_i$ is expressed by the following Equation (1).

[Equation 1]

$$R_i = \frac{1}{N} \sum^N M_i \quad (1)$$

Moreover, every time the vehicle 1 passes a same road, the measurement result value $M_i$ regarding the voxel $V_i$ is newly obtained and the occupancy $R_i$ is calculated again. That is, the occupancy $R_i$ is updated.

The occupancy $R_i$ being "1" means that an object always exists in the voxel $V_i$. The object always existing is highly likely to be an stationary object. That is to say, the occupancy $R_i$ being "1" means that there is a strong probability that a stationary object exists in the voxel $V_i$. While on the other hand, the occupancy $R_i$ being "0" means that there is a strong probability that no stationary object exists in the voxel $V_i$. The occupancy $R_i$ being around 0.5 means that it is not certain (clear) whether or not any object exists in the voxel $V_i$.

Information that "there is a strong probability that a stationary object exists" is useful. For example, such the information is used for removing the stationary object from the LIDAR point cloud to detect a moving object such as a pedestrian. Information that "there is a strong probability that no stationary object exists" also is useful. The reason is that when an object is detected in free space where no stationary object exists, the detected object can be regarded as a moving object. In this manner, the background map information BG_MAP can be utilized for detecting a moving object.

An example of a data structure of the background map information BG_MAP also is shown in FIG. 6. One data set is created for each voxel $V_i$. In the example shown in FIG. 6, the data set includes a position (absolute position) [X, Y, Z] of the voxel $V_i$, the occupancy $R_i$, evaluation information, an evaluation value, and a time stamp.

The evaluation value indicates "certainty" of the background map information BG_MAP. For example, the evaluation value indicates certainty that a stationary object exists at the position [X, Y, Z] indicated by the background map information BG_MAP. The certainty can be reworded as accuracy or reliability. The evaluation value can be reworded as a score.

The evaluation information is information used for calculating the evaluation value. The evaluation information includes the number of measurements N. When the number of measurements N is small, the evaluation value is low. As the number of measurements N becomes larger, the evaluation value becomes higher. The evaluation information may include variance of positions of the measurement points (i.e. the reflection points) included in the voxel $V_i$. As the variance becomes larger, the evaluation value becomes lower.

The control device 170 generates and updates the background map information BG_MAP based on the driving environment information 200. More specifically, the driving environment information 200 includes the surrounding situation information 210 (specifically, LIDAR measurement information) and the vehicle position information 220. The control device 170 converts the surrounding situation information 210 to that in the absolute coordinate system based on the position and the orientation of the vehicle 1 indicated by the vehicle position information 220. Then, the control device 170 generates or updates the data set regarding each voxel $V_i$ based on the surrounding situation information 210 in the absolute coordinate system. The time stamp indicates a time when the data set is generated or a time when the data set is last updated.

3-2. Feature Object Map Information FE_MAP

Figure 7:
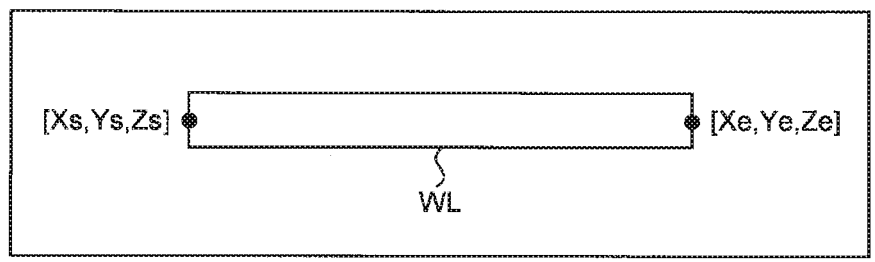
FIG. 7 is a conceptual diagram for explaining feature object map information in the embodiment of the present disclosure.

FIG. 7 is a conceptual diagram for explaining the feature object map information FE_MAP. The feature object map information FE_MAP, which is map information regarding a feature object, indicates a position (absolute position) of a feature object. The feature object is exemplified by a white line, a sign board (planar object), a pole (cylindrical object), and the like. Such the feature object map information FE_MAP is utilized, for example, for the localizing processing that increases the accuracy of the vehicle position information 220.

As an example, let us consider the feature object map information FE_MAP regarding a white line WL. The same applies to other feature objects.

A position of the white line WL is expressed by positions [Xs, Ys, Zs] and [Xe, Ye, Ze] of both ends of the white line WL. For example, at least one of the camera and the LIDAR included in the surrounding situation sensor 110 is used for calculating the position of the white line WL. More specifically, a road surface image representing a road surface is generated from camera image information or LIDAR measurement information. Subsequently, binarization processing or edge detection processing is executed to extract the white line WL from the road surface image. Then, the position of the white line WL is calculated based on the camera image information or the LIDAR measurement information.

Every time the vehicle 1 passes the same road, the same white line WL is repeatedly measured (detected) and the position of the same white line WL is repeatedly calculated. An average value or a weighted average value of the positions calculated so far is used as the position of the white line WL. That is to say, the position of the white line WL is updated every time the same white line WL is measured. In the case of the weighted average value, a weight for the latest position is set to be the largest. It should be noted that whether or not the white line WL measured this time is identical to an already-known white line WL is determined based on whether or not the white line WL measured this time is within a predetermined area around the already-known white WL.

An example of a data structure of the feature object map information FE_MAP also is shown in FIG. 7. One data set is created for each white line WL. In the example shown in FIG. 7, the data set includes the position of the white line WL, evaluation information, an evaluation value, and a time stamp.

The evaluation value indicates "certainty" of the feature object map information FE_MAP. That is, the evaluation value indicates certainty that a feature object exists at the position indicated by the feature object map information FE_MAP.

The evaluation information is information used for calculating the evaluation value. The evaluation information includes the number of measurements, variance of the calculated positions, and so forth. For example, when the number of measurements is small, the evaluation value is low. As the number of measurements becomes larger, the evaluation value becomes higher. As the variance of the calculated positions becomes larger, the evaluation value becomes lower.

The control device 170 generates and updates the feature object map information FE_MAP based on the driving environment information 200. More specifically, the driving environment information 200 includes the surrounding situation information 210 (specifically, the camera image information and the LIDAR measurement information) and the vehicle position information 220. The control device 170 converts the surrounding situation information 210 to that in the absolute coordinate system based on the position and the orientation of the vehicle 1 indicated by the vehicle position information 220. Then, the control device 170 generates or updates the data set regarding each white line WL (i.e. the feature object) based on the surrounding situation information 210 in the absolute coordinate system. The time stamp indicates a time when the data set is generated or a time when the data set is last updated.

3-3. Terrain Map Information TE_MAP

FIG. 8 is a conceptual diagram for explaining the terrain map information TE_MAP. The terrain map information TE_MAP, which is map information regarding terrain, indicates a height (altitude) Z of a road surface at a position (absolute position) [X, Y].

For example, the LIDAR included in the surrounding situation sensor 110 is used for calculating the height Z of the road surface at the position [X, Y]. More specifically, a road surface point cloud representing the road surface is extracted from the LIDAR point cloud. Further, the road surface point cloud included in a certain area in the vicinity of the position [X, Y] is extracted. Then, the height Z of the road surface at the position [X, Y] is calculated by interpolating heights $ZL_j$ of the extracted road surface points in the vicinity of the position [X, Y]. For example, an average value of the heights $ZL_j$ of the extracted road surface points is calculated as the height Z. It should be noted that the number of the road surface points used for calculating the height Z and variance of the heights $ZL_j$ may be used as evaluation information described later.

Every time the vehicle 1 passes the same road, the same road surface is repeatedly measured (detected) and the height Z of the same road surface is repeatedly calculated. An average value or a weighted average value of the heights Z calculated so far is used as the height Z. That is to say, the height Z of the road surface is updated every time the same road surface is measured. In the case of the weighted average value, a weight for the latest height Z is set to be the largest.

An example of a data structure of the terrain map information TE_MAP also is shown in FIG. 8. One data set is created for each position [X, Y]. In the example shown in FIG. 8, the data set includes the position [X, Y], the height Z, evaluation information, an evaluation value, and a time stamp.

The evaluation value indicates "certainty" of the terrain map information TE_MAP. That is, the evaluation value indicates certainty that a road surface exists at the position [X, Y] and the height Z indicated by the terrain map information FE_MAP.

The evaluation information is information used for calculating the evaluation value. The evaluation information includes the number of measurements, variance, and so forth. The number of measurements includes at least one of the number of calculations of the height Z and the number of the road surface points used for calculating the height Z. The variance includes at least one of variance of the calculated heights Z and variance of the heights $ZL_j$ of the road surface points used for calculating the height Z. For example, when the number of measurements is small, the evaluation value is low. As the number of measurements becomes larger, the evaluation value becomes higher. As the variance becomes larger, the evaluation value becomes lower. As another example, the evaluation value may become lower as a difference between the height Z and a height Z' of an adjacent position becomes larger.

The control device 170 generates and updates the terrain map information TE_MAP based on the driving environment information 200. More specifically, the driving environment information 200 includes the surrounding situation information 210 (specifically, the LIDAR measurement information) and the vehicle position information 220. The control device 170 converts the surrounding situation information 210 to that in the absolute coordinate system based on the position and the orientation of the vehicle 1 indicated by the vehicle position information 220. Then, the control device 170 generates or updates the data set regarding each position [X, Y] based on the surrounding situation information 210 in the absolute coordinate system. The time stamp indicates a time when the data set is generated or a time when the data set is last updated.

Application of the terrain map information TE_MAP is as follows. For example, it is possible to remove the road surface from the LIDAR point cloud and thus to detect an obstacle (e.g. a fallen object) on the road surface. As another example, it is possible to calculate a road surface slope from the information of the height Z and thus to plan the vehicle travel control such as acceleration and deceleration based on the road surface slope. As still another example, it is possible to identify a travel area in which the vehicle 1 can travel.

3-4. Others

The map information MAP may further include the above-described LIDAR measurement information, camera image information, road surface image information, and so forth. When acquiring such the information, the control device 170 registers the acquired information in the map information MAP.

4. INTERNAL UPDATE PROCESSING BY IN-VEHICLE DEVICE

Figure 9:
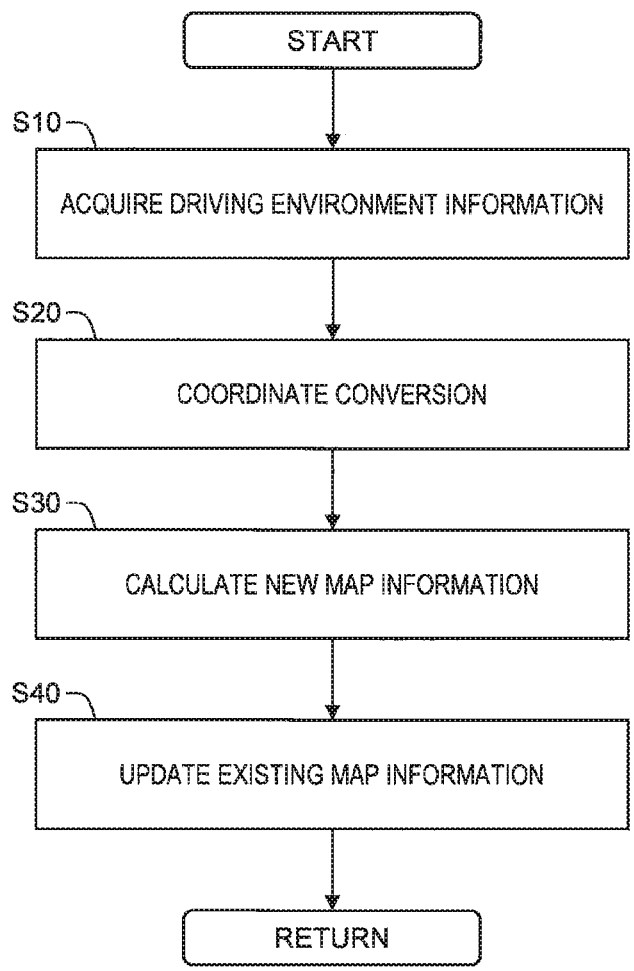
FIG. 9 is a flow chart showing internal update processing by the in-vehicle device according to the embodiment of the present disclosure.

FIG. 9 is a flow chart showing the internal update processing by the in-vehicle device 100 according to the present embodiment. The process flow shown in FIG. 9 is repeatedly executed every certain cycle.

In Step S10, the information acquisition device 20 (see FIG. 2) acquires the driving environment information 200. The driving environment information 200 is stored in the memory device 172 of the control device 170.

In Step S20, the control device 170 converts the surrounding situation information 210 to that in the absolute coordinate system based on the position and the orientation of the vehicle 1 indicated by the vehicle position information 220.

In Step S30, the control device 170 calculates new map information MAP based on the surrounding situation information 210 in the absolute coordinate system. The calculation of the map information MAP is as described in the above Section 3.

In Step S40, the control device 170 updates the existing map information MAP by using the new map information MAP calculated in Step S30. At this time, not only the main parameter (i.e. the occupancy $R_i$ regarding the voxel $V_i$, the position of the feature object, the height Z of the road surface) of the map information MAP but also the evaluation information, the evaluation value, and the time stamp are updated.

5. PROCESSING RELATED TO EXTERNAL MAP UPDATE PROCESSING

Figure 10:
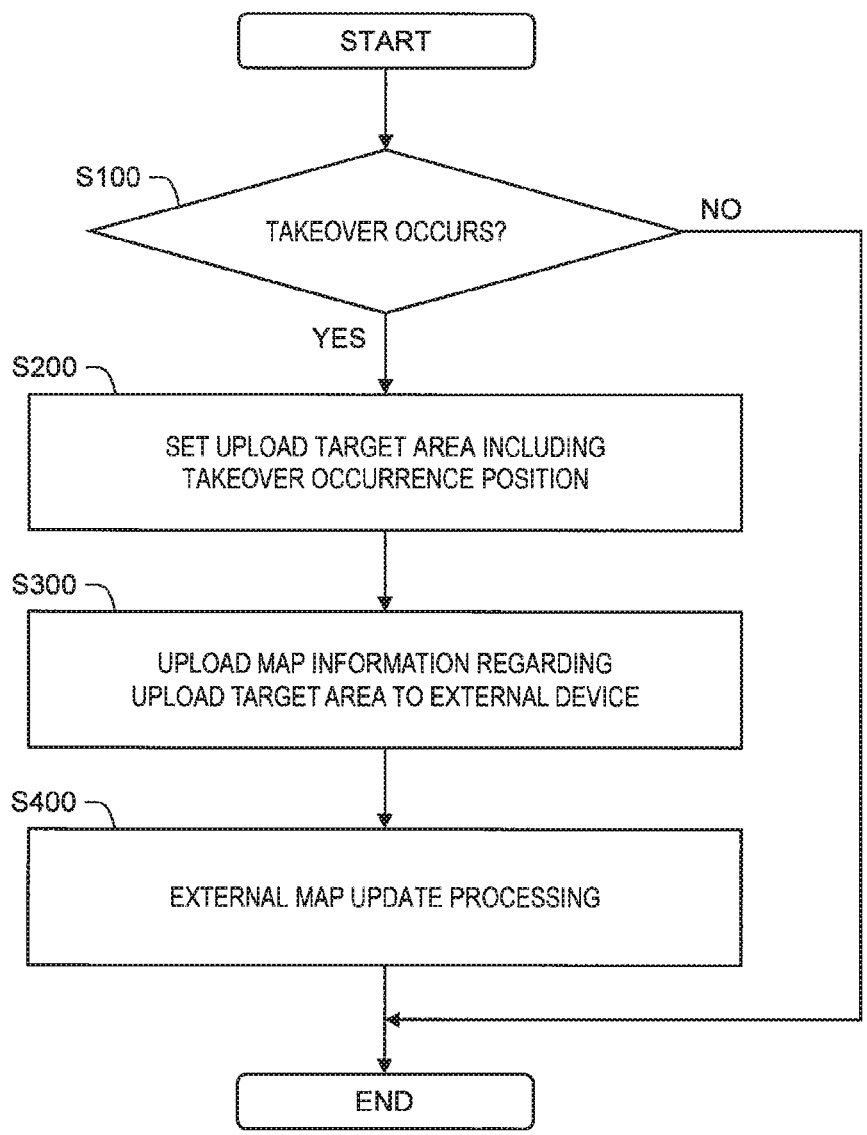
FIG. 10 is a flow chart showing processing related to external map update processing according to the embodiment of the present disclosure.

FIG. 10 is a flow chart showing processing related to the external map update processing by the external device 300 according to the present embodiment. For example, the process flow shown in FIG. 10 is executed during the automated driving control by the in-vehicle device 100 or after it is terminated.

In Step S100, the control device 170 of the in-vehicle device 100 determines whether or not a takeover occurs during the automated driving control. Typically, the takeover is performed by the driving operation (i.e. at least one of the steering operation, the acceleration operation, and the braking operation) by the driver. Therefore, the control device 170 can determine, based on the vehicle state information 230, whether or not the takeover occurs. When the takeover occurs during the automated driving control (Step S100; Yes), the processing proceeds to Step S200. Otherwise (Step S100; No), the processing this time ends.

In Step S200, the control device 170 detects the takeover occurrence position based on the vehicle position information 220. Then, the control device 170 sets the upload target area so as to include the takeover occurrence position. For example, the upload target area includes the takeover occurrence position and its vicinity. The upload target area is smaller than an area indicated by the map information MAP to which the internal update processing is applied. In other words, the upload target area is smaller than a vehicle travel area in which the driving environment information 200 is acquired.

In a subsequent Step S300, the control device 170 reads the map information MAP regarding the upload target area from the memory device 180 (i.e. the map database MAP_DB). Then, the control device 170 uploads the read map information MAP to the external device 300 through the communication device 140. Preferably, after executing the internal update processing (see FIG. 9), the control device 170 reads the latest map information MAP regarding the upload target area and uploads the latest map information MAP to the external device 300.

In Step S400, the external device 300 (i.e. the processor 320) updates the external map information EMAP stored in the memory device 310 (i.e. the map database EMAP_DB), based on the map information MAP uploaded from the in-vehicle device 100. That is, the external device 300 executes the external map update processing. Various examples can be considered as a method of the external map update processing.

5-1. First Example

Figure 11:
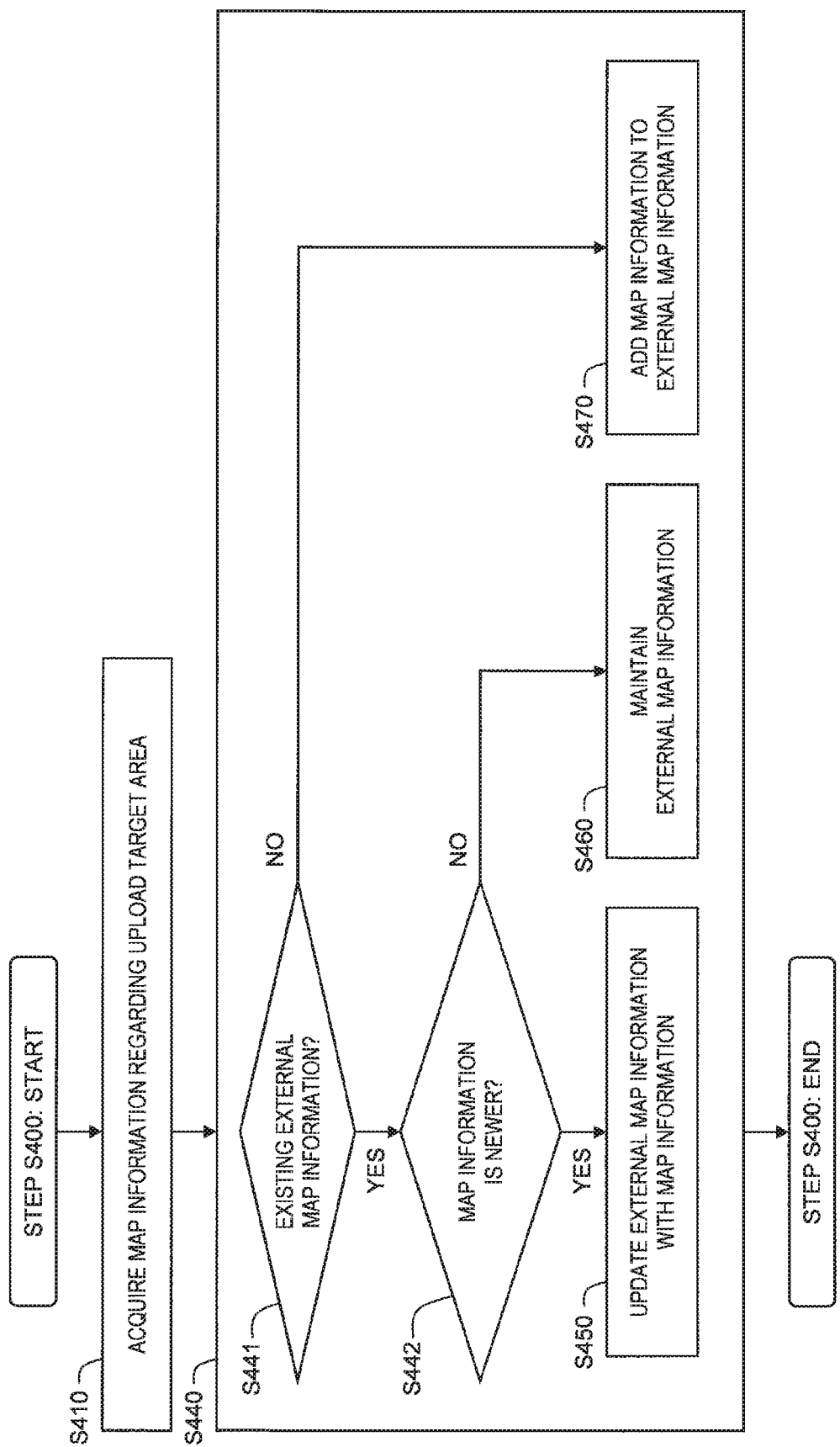
FIG. 11 is a flow chart showing a first example of the external map update processing (Step S400) according to the embodiment of the present disclosure.

FIG. 11 is a flow chart showing a first example of the external map update processing (Step S400).

In Step S410, the external device 300 acquires the map information MAP regarding the upload target area through the communication device 330.

In Step S440, the external device 300 executes the following determination processing for each point or each area in the upload target area.

In Step S441, the external device 300 determines whether or not the external map information EMAP already exists. When the external map information EMAP already exists (Step S441; Yes), the processing proceeds to Step S442. On the other hand, when the external map information EMAP does not yet exist (Step S441; No), the processing proceeds to Step S470.

In Step S442, the external device 300 compares the time stamp of the external map information EMAP and the time stamp of the map information MAP. When the time stamp of the map information MAP is newer than the time stamp of the external map information EMAP (Step S442; Yes), the processing proceeds to Step S450. Otherwise (Step S442; No), the processing proceeds to Step S460.

In Step S450, the external device 300 updates (replaces) the external map information EMAP with the map information MAP.

In Step S460, the external device 300 maintains the existing external map information EMAP without updating it.

In Step S470, the external device 300 adds the map information MAP to the external map information EMAP.

When the determination processing (Step S440) is completed over the entire upload target area, the external map update processing (Step S400) ends.

5-2. Second Example

Figure 12:
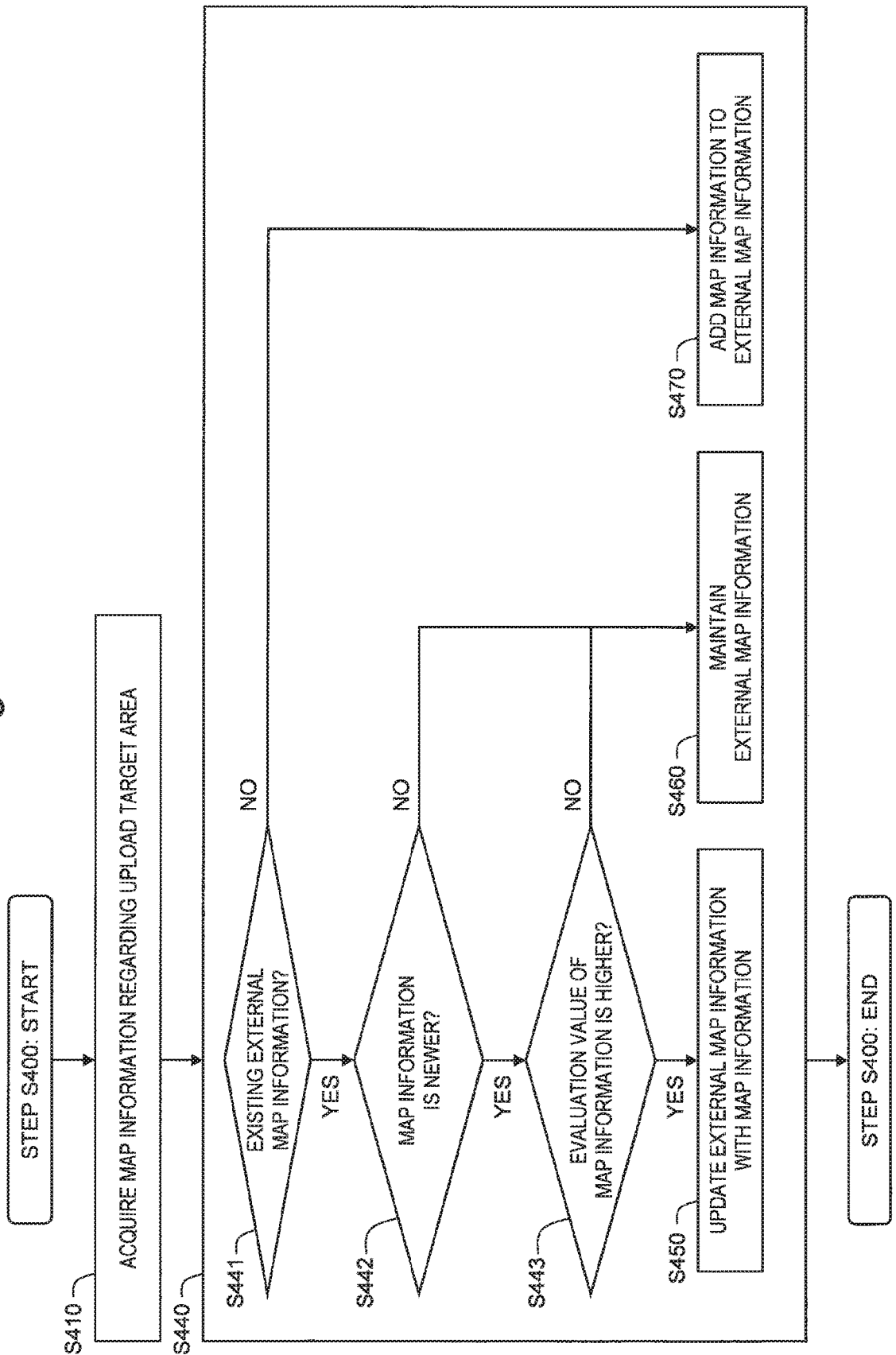
FIG. 12 is a flow chart showing a second example of the external map update processing (Step S400) according to the embodiment of the present disclosure.

FIG. 12 is a flow chart showing a second example of the external map update processing (Step S400). An overlapping description with the first example shown in FIG. 11 will be omitted as appropriate.

When the time stamp of the map information MAP is newer than the time stamp of the external map information EMAP (Step S442; Yes), the processing proceeds to Step S443 instead of Step S450.

In Step S443, the external device 300 compares the evaluation value of the external map information EMAP and the evaluation value of the map information MAP. When the evaluation value of the map information MAP is higher than the evaluation value of the external map information EMAP (Step S443; Yes), the processing proceeds to Step S450. Otherwise (Step S443; No), the processing proceeds to Step S460.

According to the second example, the external map information EMAP is prevented from being updated with the map information MAP whose evaluation value is low. That is, deterioration in accuracy (quality) of the external map information EMAP is prevented.

5-3. Third Example

Figure 13:
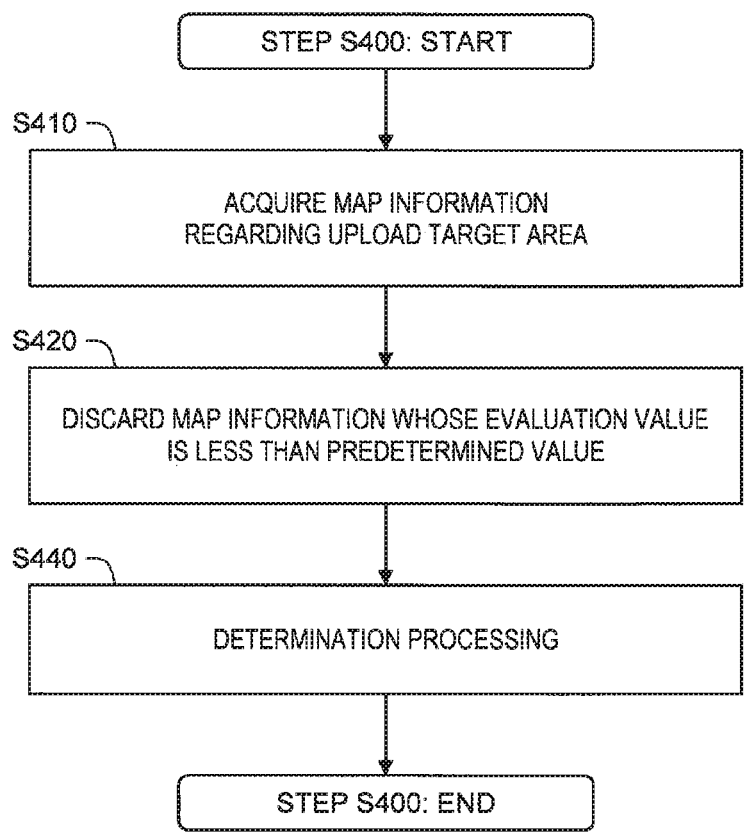
FIG. 13 is a flow chart showing a third example of the external map update processing (Step S400) according to the embodiment of the present disclosure.

FIG. 13 is a flow chart showing a third example of the external map update processing (Step S400). In the third example, Step S420 is added between Step S410 and Step S440.

In Step S420, the external device 300 discards the map information MAP whose evaluation value is less than a predetermined value. After that, the processing proceeds to Step S440. Step S440 is the same as in any of the first example and the second example described above.

As a result of Step S420, the external device 300 executes the external map update processing without using the map information MAP whose evaluation value is less than the predetermined value. Therefore, the external map information EMAP is prevented from being updated with the map information MAP whose evaluation value is low. That is, deterioration in accuracy (quality) of the external map information EMAP is prevented.

5-4. Fourth Example

Figure 14:
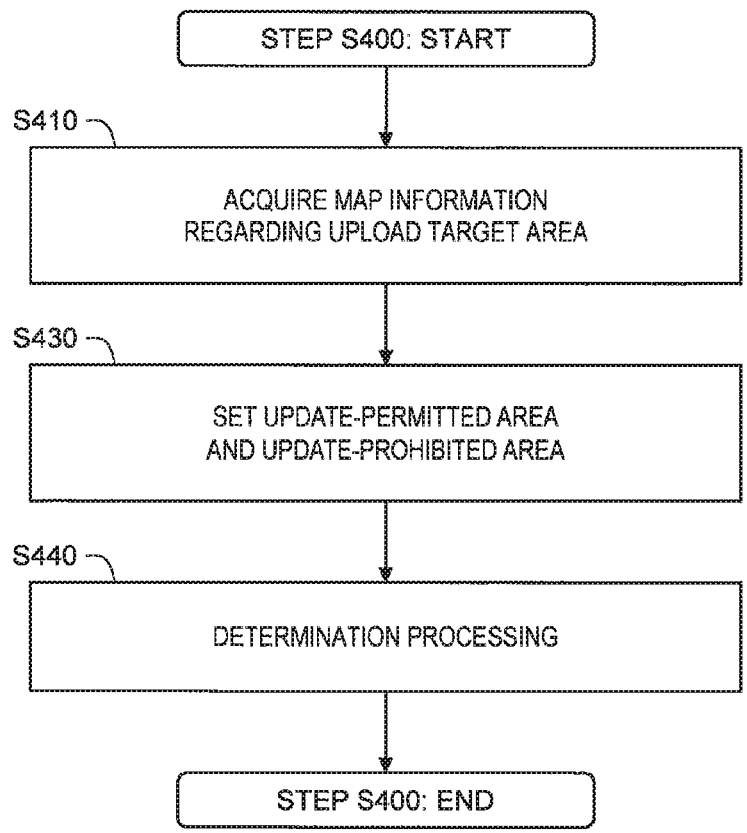
FIG. 14 is a flow chart showing a fourth example of the external map update processing (Step S400) according to the embodiment of the present disclosure.

FIG. 14 is a flow chart showing a fourth example of the external map update processing (Step S400). In the fourth example, Step S430 is added between Step S410 and Step S440.

When a content of the map information MAP is almost the same as the external map information EMAP, the external map update processing has no significant effect on the accuracy of the external map information EMAP. Such the unnecessary external map update processing is inefficient and undesirable. In view of the above, in Step S430, the external device 300 classifies the upload target area into an "update-permitted area" and an "update-prohibited area". The update-permitted area is an area in which the external map update processing is permitted. On the other hand, the update-prohibited area is an area in which the external map update processing is prohibited.

Figure 15:
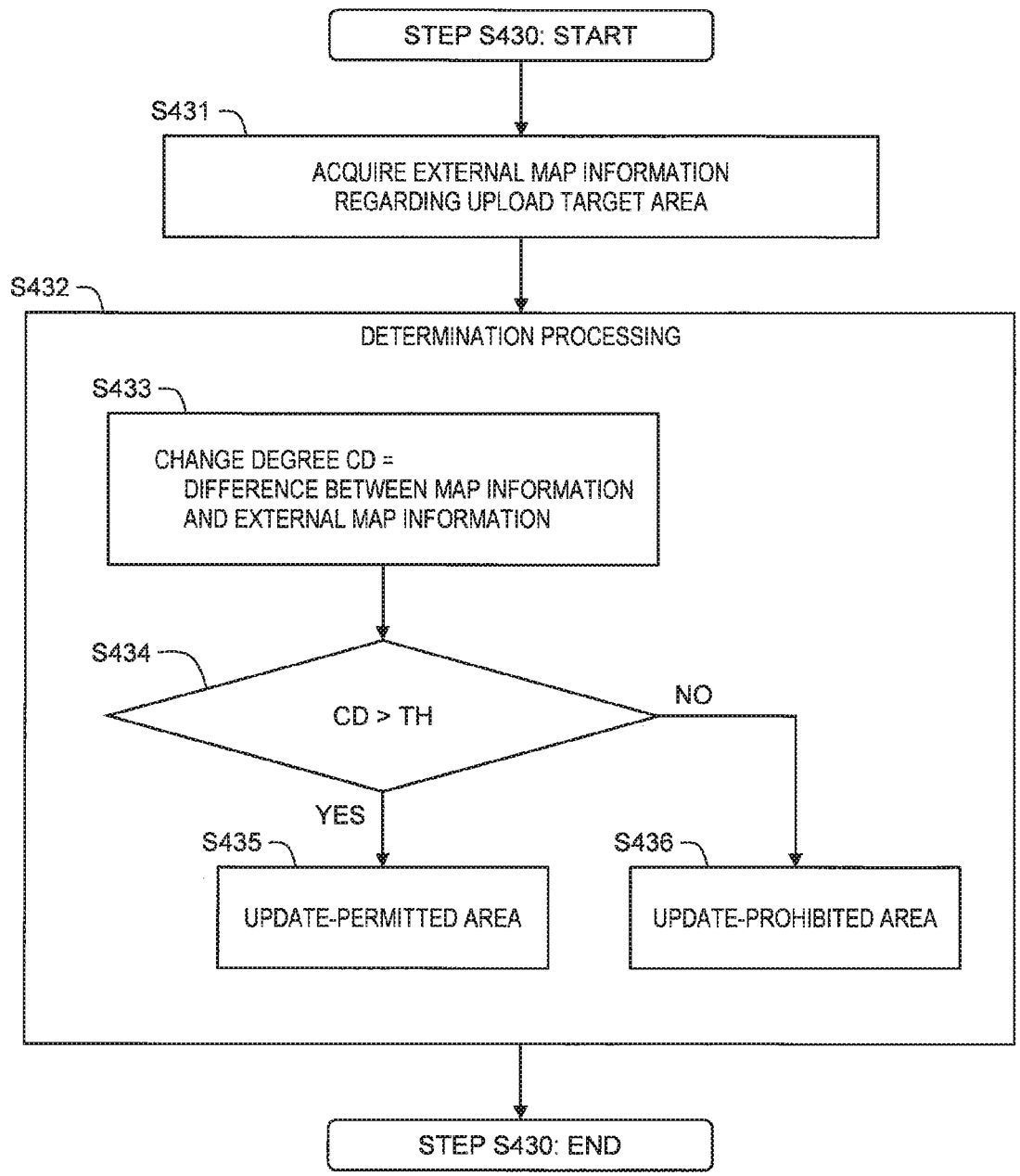
FIG. 15 is a flow chart showing an example of Step S430 in FIG. 14.

FIG. 15 is a flow chart showing an example of Step S430 in FIG. 14.

In Step S431, the external device 300 acquires the external map information EMAP regarding the upload target area from the memory device 310 (i.e. the map database EMAP_DB).

In Step S432, the external device 300 executes the following determination processing for each point or each area in the upload target area.

In Step S433, the external device 300 calculates a change degree CD being a difference between the external map information EMAP and the map information MAP. The change degree CD regarding each point in the upload target area is as follows.

In the case of the background map information BG_MAP shown in FIG. 6, the change degree CD is an absolute value of a difference in the occupancy $R_i$ between the map information MAP and the external map information EMAP.

In the case of the feature object map information FE_MAP shown in FIG. 7, the change degree CD is expressed by the following Equation (2). Here, positions [Xs1, Ys1, Zs1] and [Xe1, Ye1, Ze1] are the position indicated by the map information MAP. Positions [Xs2, Ys2, Zs2] and [Xe2, Ye2, Ze2] are the position indicated by the external map information EMAP.

[Equation 2]

$$CD1=(Xs2-Xs1)^2+(Ys2-Ys1)^2+(Zs2-Zs1)^2+(Xe2-Xe1)^2+(Ye2-Ye1)^2+(Ze2-Ze1)^2 \qquad (2)$$

In the case of the terrain map information TE_MAP shown in FIG. 8, the change degree CD is an absolute value of a difference in the height Z between the map information MAP and the external map information EMAP.

In the case of the change degree CD for each area, change degrees CD regarding respective points included in an area are first calculated. Then, a sum or an average value of the calculated change degrees CD is calculated as the change degree CD regarding said area.

In Step S434, the external device 300 compares the change degree CD with a threshold TH. When the change degree CD exceeds the threshold TH (Step S434; Yes), the processing proceeds to Step S435. On the other hand, when the change degree CD is equal to or less than the threshold TH (Step S434; No), the processing proceeds to Step S436.

In Step S435, the external device 300 classifies the point or the area as the update-permitted area.

In Step S436, the external device 300 classifies the point or the area as the update-prohibited area.

It should be noted that in the above-mentioned Step S433, the external map information EMAP may not yet exist. If the external map information EMAP does not yet exist, the processing proceeds to Step S435 in order to newly register the external map information EMAP.

Step S440 (see FIGS. 11 and 12) after Step S430 is executed for each point or each area in the update-permitted area. That is to say, the external device 300 prohibits the external map update processing with respect to the update-prohibited area and permits the external map update processing with respect to the update-permitted area. The external device 300 can execute the external map update processing with respect to the update-permitted area, but does not execute the external map update processing with respect to the update-prohibited area.

According to the fourth example, as described above, the external map update processing is not executed with respect to the update-prohibited area in which the change degree CD is small. In other words, the external map update processing having no significant effect on the external map information EMAP is prevented from being executed. That is, unnecessary external map update processing is not executed and the external map update processing is executed efficiently. It is thus possible to efficiently update the external map information EMAP.

The fourth example can be combined with any of the first to third examples described above.

As another example, in the above-described Step S432, the external device 300 may classify a point or an area where the evaluation value of the map information MAP is less than the predetermined value as the update-prohibited area. Also in this case, the external device 300 executes the external map update processing without using the map information MAP whose evaluation value is less than the predetermined value. Therefore, the same effects as in the case of the above-described third example can be obtained.

6. MODIFICATION EXAMPLE

Figure 16:
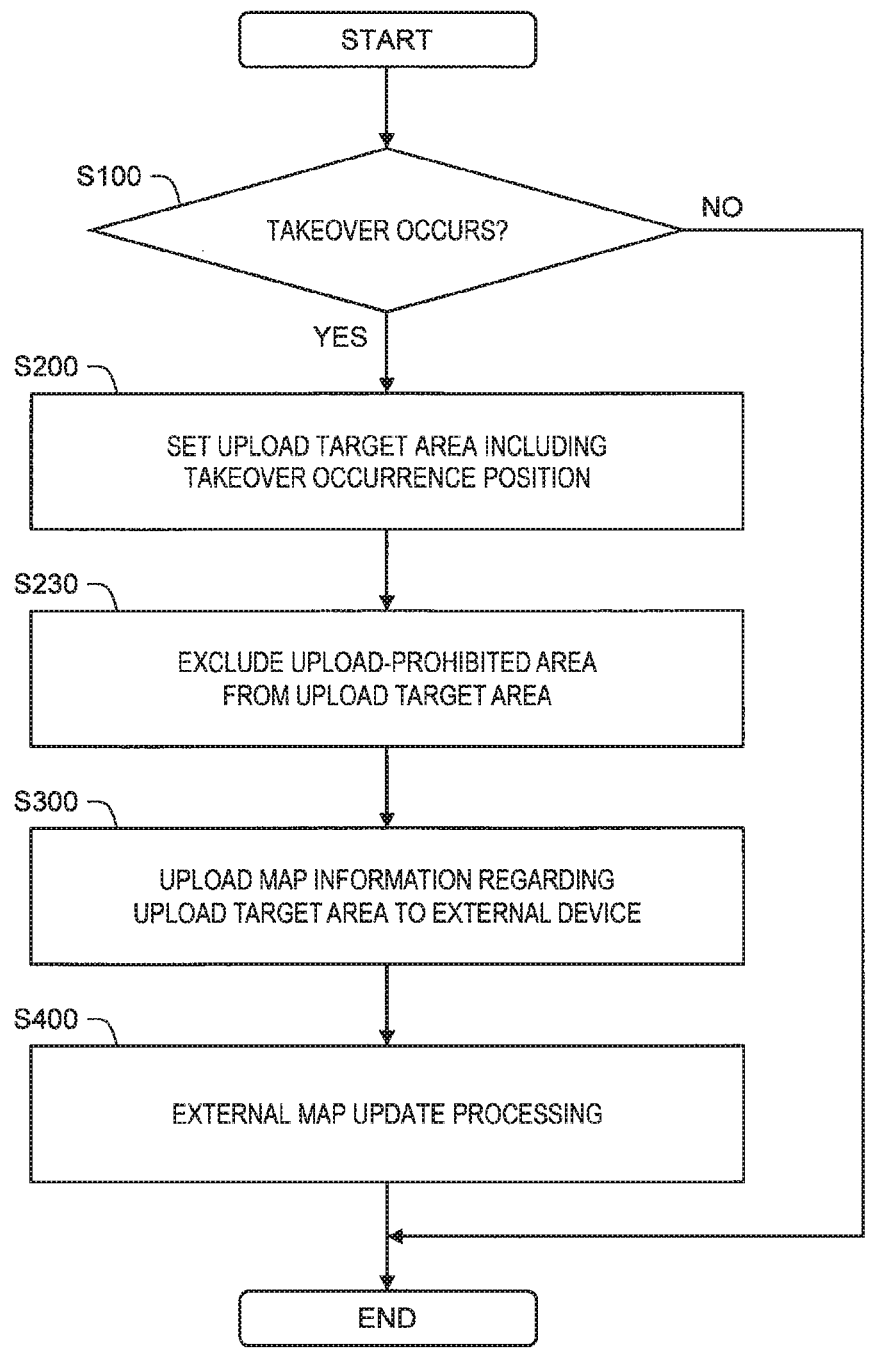
FIG. 16 is a flow chart showing a modification example of the processing related to the external map update processing according to the embodiment of the present disclosure.
Figure 17:
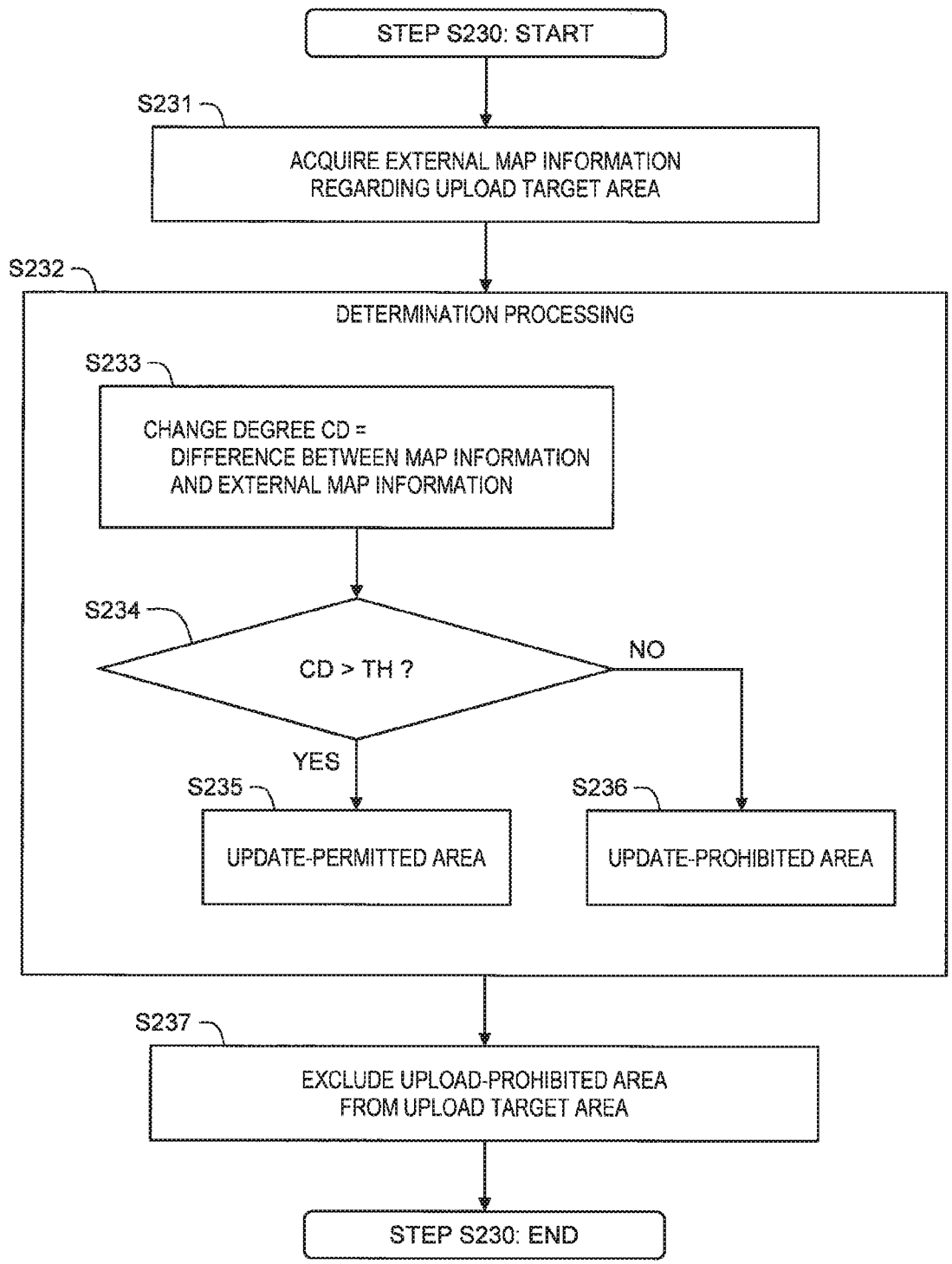
FIG. 17 is a flow chart showing an example of Step S230 in FIG. 16.

FIG. 16 is a flow chart showing a modification example of the processing related to the external map update processing according to the present embodiment. As compared with the process flow shown in the foregoing FIG. 10, Step S230 is added between Step S200 and Step S300. FIG. 17 is a flow chart showing an example of Step S230 in FIG. 16.

In Step S231, the control device 170 of the in-vehicle device 100 acquires the external map information EMAP regarding the upload target area from the external device 300. More specifically, the control device 170 transmits a map provision request that requests for provision of the external map information EMAP regarding the upload target area, to the external device 300 through the communication device 140. In response to the map provision request, the processor 320 of the external device 300 reads the external map information EMAP regarding the upload target area from the memory device 310. Then, the processor 320 transmits the read external map information EMAP to the in-vehicle device 100 through the communication device 330. The control device 170 receives the external map information EMAP regarding the upload target area through the communication device 140.

In Step S232, the control device 170 executes the following determination processing for each point or each area in the upload target area.

In Step S233, the control device 170 calculates the change degree CD being a difference between the external map information EMAP and the map information MAP. The calculation of the change degree CD is the same as in the case of the fourth example described in the above Section 5-4.

In Step S234, the control device 170 compares the change degree CD with a threshold TH. When the change degree CD exceeds the threshold TH (Step S234; Yes), the processing proceeds to Step S235. On the other hand, when the change degree CD is equal to or less than the threshold TH (Step S234; No), the processing proceeds to Step S236.

In Step S235, the control device 170 classifies the point or the area as the update-permitted area.

In Step S236, the control device 170 classifies the point or the area as the update-prohibited area.

When the determination processing (Step S232) is completed over the entire upload target area, the processing proceeds to Step S237. In Step S237, the control device 170 excludes the update-prohibited area from the upload target area. After that, the processing proceeds to Step S300.

The present modification example also can achieve the same effects as in the case of the fourth example described in the above Section 5-4. That is, the external map update processing is not executed with respect to the update-prohibited area in which the change degree CD is small. In other words, the external map update processing having no significant effect on the external map information EMAP is prevented from being executed. It is thus possible to efficiently update the external map information EMAP.

The present modification example can be combined with any of the first to third examples described above.

What is claimed is:

1. A map information system comprising:
an in-vehicle device installed on a vehicle and configured to control automated driving of the vehicle; and
an external device having external map information used for the automated driving, the external map information comprising a first time stamp and a first evaluation value indicating certainty of the external map information, wherein the in-vehicle device comprises:
  a memory device in which map information is stored, the map information comprising a second time stamp and a second evaluation value indicating certainty of the map information;
  an information acquisition device configured to acquire driving environment information indicating driving environment for the vehicle using a sensor; and
  a control device configured to control the automated driving based on the map information stored in the memory device, wherein the control device is further configured to:
    determine whether a takeover, the takeover being is a transition from the automated driving to manual driving, occurs during the automated driving;
    based on the determination that the takeover occurs during the automated driving, set an upload target area including a position where the takeover occurs; and
    read map information regarding the upload target area from the map information stored in the memory device and upload the read map information to the external device,
    execute an internal update to the map information stored in the memory device, based on the driving environment information, wherein the internal update is applied to an area of the map information that is larger than the upload target area,
    subsequent to executing the internal update, read the map information regarding the upload target area from the memory device and upload the read map information to the external device, and
wherein the external device is configured to:
  based on the second time stamp of the map information uploaded from the in-vehicle device being newer than the first time stamp of the external map information and the second evaluation value of the map information uploaded from the in-vehicle device being higher than the first evaluation value of the external map information, update the external map information based on the map information uploaded from the in-vehicle device;
  based on the second time stamp of the map information uploaded from the in-vehicle device being newer than the first time stamp of the external map information and the second evaluation value of the map information uploaded from the in-vehicle device being equal to or lower than the first evaluation value of the external map information, maintain the external map information without updating; and
  based on the second time stamp of the map information uploaded from the in-vehicle device being older than the first time stamp of the external map information, maintain the external map information without updating independent of a relationship between the first evaluation value of the external map information and the second evaluation value of the map information.

2. The map information system according to claim 1, wherein
 the external device is further configured to update the external map information having the second evaluation value that is less than a predetermined value.

3. The map information system according to claim 1, wherein
 the external device is further configured to:
  calculate a change degree, that is a difference between the map information and the external map information, for each point or each area in the upload target area;
  prohibit the update to the external map information with respect to an update-prohibited area in which the change degree is equal to or less than a threshold; and
  permit the update to the external map information with respect to an update-permitted area in which the change degree exceeds the threshold.

4. The map information system according to claim 1, wherein
 the control device is further configured to:
  calculate a change degree that is a difference between the map information and the external map information, for each point or each area in the upload target area; and
  exclude an update-prohibited area in which the change degree is equal to or less than a threshold, from the upload target area.

5. The map information system according to claim 1, wherein the in-vehicle device detects an object in an area surrounding the vehicle, the first evaluation value indicates certainty of a position of the object in the external map information, and the second evaluation value indicates certainty of a position of the object in the map information.

* * * * *